E. A. L. ROBERTS.
Lathe Chuck.
No. 25,674.
Patented Oct. 4, 1859.
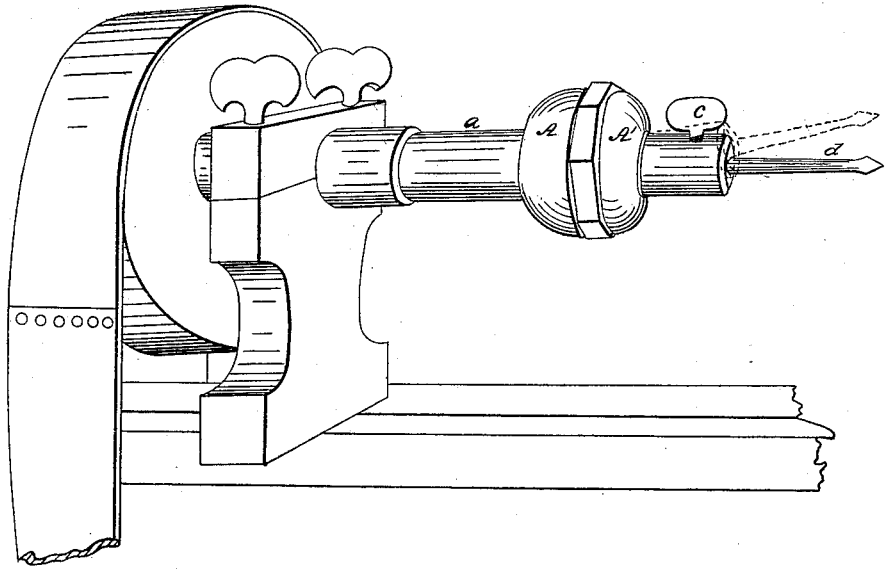
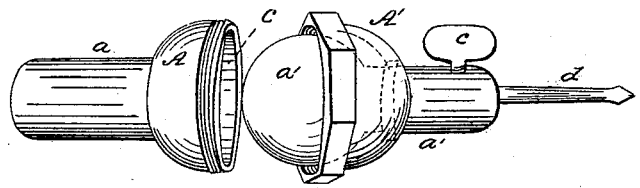
Witnesses:
Inventor:

UNITED STATES PATENT OFFICE.

EDWARD A. L. ROBERTS, OF NEW YORK, N. Y.

LATHE-CHUCK.

Specification of Letters Patent No. 25,674, dated October 4, 1859.

*To all whom it may concern:*

Be it known that I, EDWARD A. L. ROBERTS, of the city and State of New York, have invented a new and Improved Lathe-Chuck and Mandrel, by which any tool may be quickly and truly centered or may be set at any required inclination from the center; and I do hereby declare that the following is a full, clear, and exact description thereof and of its construction and mode or manner of operation, reference being had to the accompanying drawings, and to the letters of reference marked thereon, making a part of this specification.

Figure I shows a lathe with my improved chuck and mandrel, and a tool centered, and also set at an angle with the center. Fig. II shows the two parts of the chuck disconnected, to exhibit their action upon each other.

The nature of my invention consists in so constructing the chuck and mandrel, that its parts shall have free motion upon each other in every direction, so that any tool can be quickly, easily and perfectly centered, and can also, when desired, be set at any angle with the center.

My invention can be attached to any lathe, as ordinarily constructed, by the stem $a$, and either by a screw, or socket, or in any desirable manner, or as most convenient or best adapted to the particular work to be done by the lathe.

The chuck and mandrel is made in two parts, the one A, fixed firmly to the lathe head, and the other $a'$, into which the tool $d$, is fastened, turning freely in or upon the part A. This freedom of motion is secured by making the parts A, and $a'$, where they meet each other, in the form of a ball and socket joint, as shown in Fig. 2. These parts are kept and fastened together by means of a cap A', which covers the ball, and screws to the part A, and which can easily be loosened or made tight as circumstances require.

In lathes as ordinarily constructed, the mandrel holding the tool, or thing to be turned, has to be centered with great care and nicety, and not infrequently much time is consumed in thus preparing the thing for use. In many kinds of work, as in dental operations, where the tool to be used can be fastened or centered only from one direction, each different article has to have its own particular mandrel, and much expense is thus incurred. By my improvement however, as the two parts have free movement upon each other, and one is a mandrel, the tool can be inserted directly in the part $a'$, and fastened by the thumb screw $c$, and by loosening a little the cap A', the tool can be easily centered, and by any person, and the cap A', being fastened, the lathe is ready for use. The cap A' may cover the ball $a'$ more or less as desired—but the less it covers such ball, the more inclination can be given the end holding the tool. Such cap may also screw upon the other part as represented, or may be fastened by thumb screws acting against the ball $a'$. The particular manner of fastening the parts together is not however material.

The use of my invention furnishes a perfect compensation or cure for any wear of the common center or axle of the lathe or any spring or bend of the lathe head which under ordinary circumstances would render the motion of the lathe untrue and its action unsatisfactory, as by the movement of the part $a'$, any such inequality of motion can be corrected.

My invention also renders it easy, without any change in the lathe, to cause the tool to move in a circle and thus cut a true cylinder. This is readily accomplished by fixing the part $a'$ so that the point of the tool will be at any desired distance from the center. The tool will then describe a circle, the radius of which is equal to the distance of the point of the tool from the center line.

What I claim as my invention and desire to secure by Letters Patent is—

The application and use of the ball and socket joint in combination with the mandrel or chuck of lathes substantially as and for the purposes set forth and described.

E. A. L. ROBERTS.

Witnesses:
S. D. LAW.
C. F. BARNES.